Jan. 27, 1959  A. S. GILL, JR  2,870,888
MAGNETIC CLUTCH
Filed May 20, 1955
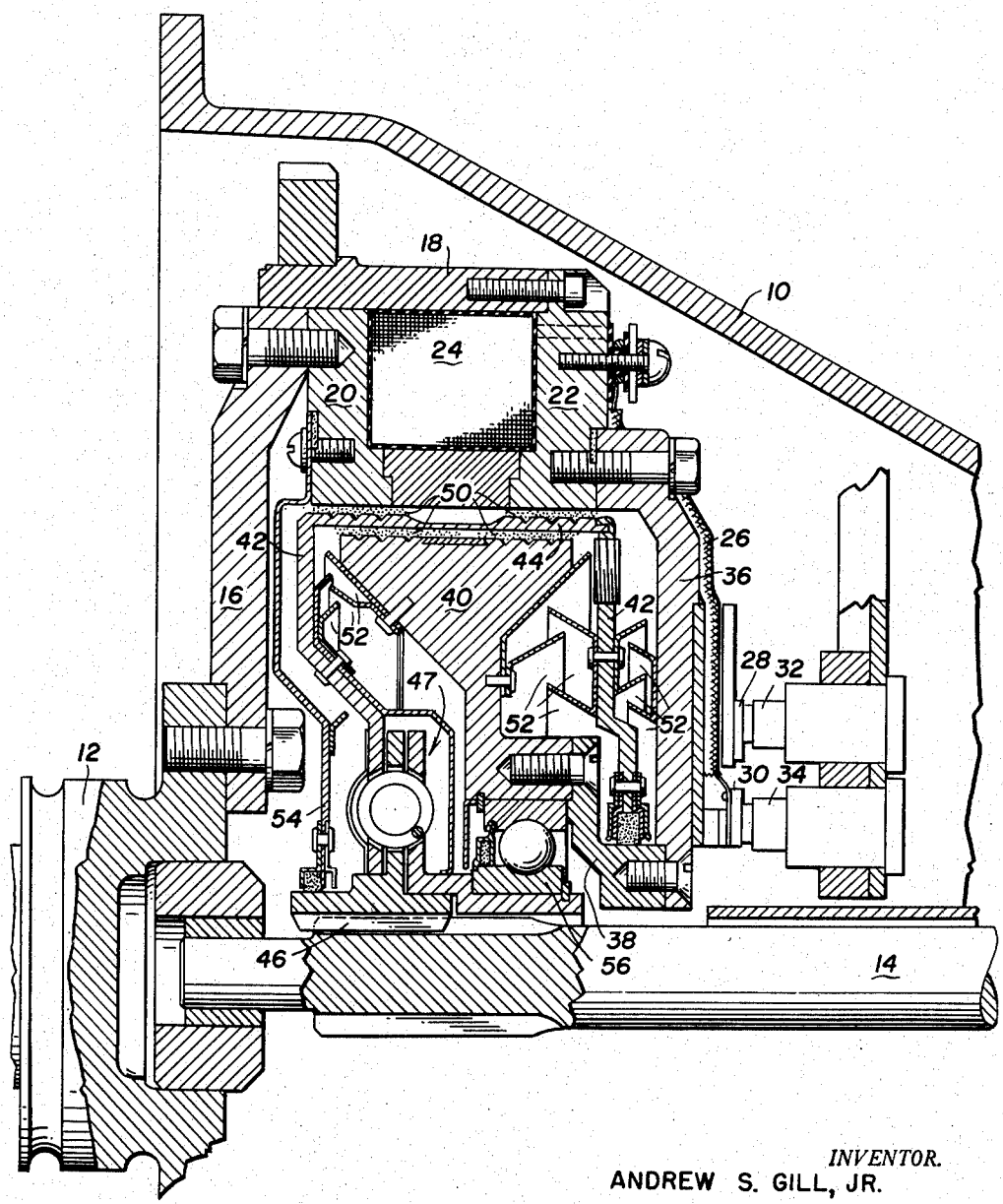
INVENTOR.
ANDREW S. GILL, JR.
BY
ATTORNEYS

United States Patent Office 2,870,888
Patented Jan. 27, 1959

2,870,888

MAGNETIC CLUTCH

Andrew S. Gill, Jr., South Euclid, Ohio, assignor to Eaton Manufacturing Company, Cleveland, Ohio, a corporation of Ohio Application May 20, 1955, Serial No. 509,945

5 Claims. (Cl. 192—21.5)

This invention relates to a magnetic clutch and more particularly to a magnetic clutch of the type employing relatively rotatable members coupled, respectively, to a power source and a load and having located therebetween a magnetic bonding material responsive to a magnetic field to couple said relatively rotatable members for unitary rotation.

Broadly the present invention comprehends the provision of an electromagnetic clutch apparatus having a pair of members unitarily rotatable relative to a third member disposed in an annular space between the first two members. In cross section the first member has the shape of the letter U and the third member also of the shape of the letter U and located within the first member, encloses on three sides the second member of the clutch. Magnetic bonding material, preferably in the form of a powder, is located in the spaces between the respective members and is responsive to a magnetic field for providing a coupling between the members. Sealing means confine the two quantities of magnetic material to the spaces between the first and third and between the third and second members to prevent the escape or the commingling thereof.

The first and second members being secured for unitary rotation, move relative to the third member in accordance with the load applied to the third member and the coupling afforded by the magnetic field and the magnetic powder bonding material.

It has been observed that by providing two pairs of air gaps to facilitate a bond between an annular clutch output member and its associated input member the magnetic pole portions are more economically adapted for their purpose thereby decreasing the necessary amount of iron for the clutch field poles. Consequently, an increased number of gaps are effective to correspondingly increase the torque transfer characteristics of a clutch. Advantage is taken of this feature to increase the output per unit weight of the apparatus. This is so because the same pole face area may be obtained with less iron by employing a pair of gaps rather than a single gap. Although increased magneto-motive force may be necessary with multiple gaps with a consequent increased number of coil turns the saving in weight of iron is far greater than the added weight of coil turns.

Further provision is made in the superfices of the second and third members for the retention and storage of magnetic powder material under deenergized conditions of the clutch. Grooves are formed in the superfices so as to provide additional space for the magnetic powder material upon deenergization of the coil and thereby to prevent packing of the powder between the members.

It is an object of the present invention to provide an electromagnetic clutch apparatus having improved torque transfer characteristics and improved torque per unit weight ratio.

It is a further object of the present invention to provide an electromagnetic clutch apparatus having multiple sets of air gaps facilitating multiple torque transferring portions to increase the torque transmitting function thereof.

It is a still further object of the present invention to provide an electromagnetic clutch apparatus having a pair of rotatable input members connected in a novel manner for unitary rotation.

Other and further advantages and objects will become apparent from a consideration of the detailed description taken with the accompanying drawing in which the figure shows a sectional view of the clutch of the present invention.

Referring now more particularly to the figure of the drawing for a more complete description of the present invention 10 represents the clutch housing enclosing the entire clutch apparatus and having an opening at one end to admit an input shaft 12 and an opening at its axially opposite end to admit an output shaft 14. Shaft 12 has securely attached thereto a plate member 16 to which in turn is attached an annular pole portion 18 and a pair of radial pole portions 20 and 22. Pole portions 18, 20 and 22 comprising the first clutch member are spaced so as to enclose on three sides a coil of wire 24 for producing a magnetic field to be described. Energization is provided to the coil through appropriate connections including wires such as wire 26, slip rings 28 and 30 and brushes 32 and 34. Securely attached to radial pole portion 22 is a second plate member 36 extending radially inwardly from portion 22 and having secured at the inward extremity thereof an angular support 38 for a second clutch member 40 which extends outwardly proximately to, but is spaced from, pole portions 20 and 22. Member 40 is dimensioned and positioned to receive magnetic flux from either of the pole portions and to deliver it to the other. A third clutch member having generally radial portions 42 and an annular portion 44 interposed between members 20, 22 and 40 is mounted on shaft 14 for rotation therewith by way of a spline connection 46 through a vibration damper 47. The third clutch member is rotatable relative to each of the first and second clutch members or is rotatable with each of the first and second clutch members depending on the coupling between the members provided by the magnetic field produced by coil 24.

Magnetic powder material 50 is located between each of the clutch members and is responsive to magnetic fields to provide a coupling between the members in a well-known manner.

To prevent the escape of magnetic powder material from the operating spaces between clutch members and to prevent the commingling of the material, labyrinth seals 52 are provided attached to radial portions of the three clutch members and to an additional plate member 54 secured to field portion 20.

The first clutch member including pole portions 20 and 22 and the second clutch member 40 are rotatable in unison relative to the third clutch member about an anti-friction bearing 56 located between the second and third members.

It will be observed that in the present clutch magnetic flux is produced by the coil 24 and permeates and traverses the gaps between clutch members in sequence. That is, the same flux emanating radially inwardly from pole portion 20, for example, traverses inwardly the gaps between pole portion 20 and member 44 and between portion 44 and member 40 and likewise traverses outwardly the gaps between member 40 and portion 44 and between portion 44 and pole portion 22. Suitable nonmagnetic material is located between the inner ends of pole portions 20 and 22 to prevent short circuiting of the magnetic field. Accordingly, since the high flux intensity of coil 24 traverses the gaps including the magnetic bonding material twice an increased coupling is afforded over devices having merely a single gap traversal.

The magnetomotive force required for a pair of traversals of air gaps must necessarily be greater than that for a single gap and can be obtained by increased turns of coil 24, by increased current in the coil 24 or by any combination thereof. In the event increased turns are employed to obtain increased flux, it is noted that the weight added thereby is small relative to the weight of coils employed for a single pair of air gaps.

While this invention has been described in connection with a certain specific embodiment, the principle involved is susceptible of numerous other applications without deviating from the spirit or scope thereof. It is intended, therefore, that the invention be limited only as indicated by the appended claims.

What I claim is:

1. A magnetic clutch comprising a pair of driving members and a driven member rotatable relative to said driving members, a first of said driving members including a pair of axially spaced pole portions and an electromagnetic coil therebetween for providing a magnetic field, a second of said driving members located concentrically within said first driving member and separated therefrom to provide an opening, said driven member including spaced plate supporting means disposed axially on opposite sides of said second driving member and a sleeve portion located in said opening and secured in spaced relation to each of said driving members by said spaced plate supporting means to provide a dual pair of axially spaced gaps, magnetic material in said gaps responsive to said magnetic field for providing a bond between said members to urge the unitary movement thereof, sealing means disposed adjacent said plate supporting means for confining the magnetic material in said respective gaps and preventing the commingling thereof, said magnetic field traversing sequentially each of said pole portions, each of said gaps and each of said members to provide a coupling therebetween.

2. A magnetic clutch according to claim 1 wherein one of said driving members and said driven member are provided with grooves in the superficies thereof.

3. A magnetic clutch comprising a first driving member having a pair of axially spaced, annular pole pieces, coil means between said pole pieces for producing a magnetic field, a ring joining said pole pieces at the outer extremities thereof, a pair of circular plates connected to opposite axial extremities of said pole pieces and extending radially therefrom, input means connected to a radially inward portion of one of said plates for driving rotation thereof, a second circular input member concentric and located within said first input member and being spaced therefrom to provide an opening, said second input member at its outer periphery having an axial extent along a portion of each of said pole pieces and means connected near a radially inward portion of said second input member and connected to a radially inward portion of the second of said plates to provide unitary rotation of said first and second driving members, a driven member having an axial portion extending between said pole pieces and the outer periphery of said second input member, a pair of generally circular members connected respectively to opposite ends of said axial portion of said driven member, and extending radially inwardly therefrom, one of said generally circular members being connected near its center to an output shaft and the other of said generally circular members extending radially inwardly proximately to the junction between said first and second driving members, magnetic powder material located between axial portions of said driving and driven members, and sealing means located between radial portions of said driving and driven members to retain said powder material within said clutch.

4. In a magnetic clutch, a driving assembly comprising a first driving member carrying energizing means, axially spaced, radially directed ring members connected to said energizing means, a second driving member disposed axially within and connected to said first driving member and radially spaced therefrom, an output shaft, a driven assembly, comprising a sleeve portion disposed radially between said first driving member and said second driving member, axially spaced, radially directed end portions, one of said end portions connected to and supporting one end of said sleeve portion and being connected to said output shaft and the other of said end portions being rotatably supported on said driving assembly and connected to and supporting the other end of said sleeve portion whereby said sleeve portion is maintained uniformly, radially spaced from said driving members.

5. A magnetic clutch comprising a first input member including a generally hollow, cylindrical portion and a pair of generally planar end portions connected thereto, said cylindrical portion embodying means for producing a magnetic field, a second input member mounted within and rotatable with said first input member and including an axial portion extending substantially along the cylindrical portion of said first input member and being radially spaced therefrom, a driven member having a sleeve portion located in the space between said input members and defining separate annular spaces between said input members and said driven member, said driven member having a first radial end portion connected to said sleeve portion and extending radially between said input members, a second radial end portion connected to said sleeve portion, a shaft means connected to said second radial end portion near the axis thereof, bearing means disposed radially between said shaft means and said second input member, means fixedly connecting said first and second input members radially inward of said bearing means, said first radial end portion being rotatably supported on said means fixedly connecting said first and second input means whereby said cylindrical portion of said driven member is maintained in uniformly, radially spaced relationship with said input members, magnetic material located in said annular spaces between said members and sealing means between said end portions of said members for retaining said magnetic material in said clutch.

References Cited in the file of this patent

UNITED STATES PATENTS

| 2,630,199 | Gamble | Mar. 3, 1953 |
| 2,745,527 | Winther | May 15, 1956 |
| 2,757,557 | Hoffman | Aug. 7, 1956 |

FOREIGN PATENTS

| 147,719 | Sweden | Nov. 16, 1954 |

OTHER REFERENCES

Technical Report 1213, National Bureau of Standards, Washington, D. C. (Copyright in U. S. Patent Office, received March 30, 1948.)